(12) United States Patent
Olson et al.

(10) Patent No.: US 7,129,490 B2
(45) Date of Patent: Oct. 31, 2006

(54) OJECT DETECTION TECHNOLOGY

(75) Inventors: Gary Olson, Belle Plaine, MN (US); Andrew J. Pichotta, Montgomery, MN (US); Eardly L. Ham, Eden Prairie, MN (US)

(73) Assignee: Control Products, Chanhassen, MN (US)

( * ) Notice: Subject to any disclaimer, the term of this patent is extended or adjusted under 35 U.S.C. 154(b) by 55 days.

(21) Appl. No.: 10/348,930

(22) Filed: Jan. 21, 2003

(65) Prior Publication Data
US 2003/0155488 A1    Aug. 21, 2003

Related U.S. Application Data

(60) Provisional application No. 60/351,309, filed on Jan. 19, 2002.

(51) Int. Cl.
*G01J 5/02*        (2006.01)
(52) U.S. Cl. .............................. 250/341.1; 250/338.1; 250/336.1; 250/340
(58) Field of Classification Search ............ 250/341.1, 250/340, 338.1, 336.1
See application file for complete search history.

(56) References Cited
U.S. PATENT DOCUMENTS
5,495,103 A * 2/1996 Utiger et al. ............. 250/222.1
RE35,762 E * 4/1998 Zimmerman ................. 250/574
6,384,402 B1 * 5/2002 Hair, III et al. .......... 250/223 R
2001/0039804 A1 * 11/2001 Newman et al. .............. 62/66

\* cited by examiner

*Primary Examiner*—David Porta
*Assistant Examiner*—Christine Sung
(74) *Attorney, Agent, or Firm*—Skinner and Associates

(57) ABSTRACT

A detection apparatus is discloses comprising an emitter for emitting a plurality of optical pulses; a detector for receiving the optical pulses from the emitter; and a controller connected to the emitter and the detector, the controller comparing a difference between at least one pulse received at the detector and at least one other pulse received at the detector with a threshold to detect the presence of an object between the emitter and detector. Also discloses is an object processing system, which automatically detects the presence of objects at at least one predetermined location during object processing, comprising an object processing subsystem; and an object detection subsystem communicatively connected to the object processing subsystem. The object detector is particularly useful in medical/pharmaceutical dispensing systems, automated manufacturing and production systems, food processing systems, commercial and industrial food service systems, packaging systems, and a variety of other commercial, industrial, municipal and residential systems, for sensing the presence, absence or flow of various objects or material.

2 Claims, 2 Drawing Sheets

OJECT DETECTION TECHNOLOGY

CROSS-REFERENCE TO RELATED APPLICATIONS, IF ANY

This application claims the benefit under 35 U.S.C. §119 (e) of co-pending U.S. Provisional Patent Application Ser. No. 60/351,309, filed Jan. 19, 2002, which is hereby incorporated by reference.

STATEMENT REGARDING FEDERALLY SPONSORED RESEARCH OR DEVELOPMENT

Not applicable

REFERENCE TO A MICROFICHE APPENDIX, IF ANY

Not applicable

BACKGROUND OF THE INVENTION

1. Field of the Invention

The present invention relates, generally, to electronic systems and methods. Particularly, the invention relates to an apparatus and method of detecting an object or the lack of the presence of an object. More particularly, the invention relates to a device and method of high speed detection of the presence or lack of an object via pulse amplitude differential measurement. The invention is particularly useful in medical/pharmaceutical dispensing systems, automated manufacturing and production systems, food processing systems, commercial and industrial food service systems, packaging systems, and a variety of other commercial, industrial, municipal and residential systems, for sensing the presence, absence or flow of objects or material.

2. Background Information

The state of the art includes various systems that utilize one or more optical or other sensors in their operations for detecting objects.

Methods or apparatus which attempt to reject, limit or otherwise avoid noise in optical sensor systems are disclosed, in general, in the following United States patents: Skell et al., U.S. Pat. No. 5,744,793; Skell et al., U.S. Pat. No. 5,550,369; Skell et al., U.S. Pat. No. 5,491,333; Grozinger et al., U.S. Pat. No. 5,250,801; Schiller, U.S. Pat. No. 5,245,177; Kim, U.S. Pat. No. 4,973,834; Hatten et al, U.S. Pat. No. 4,282,430; Hösel, U.S. Pat. No. 5,002,102; Fukuyama et al., U.S. Pat. No. 4,306,147; Devale, U.S. Pat. No. 4,437,499; and Upton, U.S. Pat. No. 4,202,387. Known portion control apparatus and methods for dispensing systems are shown in the following United States patents: Upton, U.S. Pat. No. 4,202,387 and Skell et al., U.S. Pat. No. 5,744,793.

This technology is believed to have limitations and shortcomings, including vulnerability to noise or error caused by dirty, scaled or otherwise fully or partially blocked transmitters or sensors, weak transmitters or sensors, fluctuations in temperature, resistance or capacitance, or ambient sunlight or interior lighting. For this and other reasons, a need exists for the present invention.

The invention provides a system, apparatus and method which are believed to fulfil the need and to constitute an improvement over the background technology.

Applicants' assignee is the owner of the following US patents and US patent applications: Olson et al., U.S. Pat. No. 5,902,998 entitled Apparatus and Method for Detecting an Object Using Digitally Encoded Optical Signals, issued May 11, 1999; Olson et al., U.S. Pat. No. 6,265,709 B1 entitled Apparatus and Method for Detecting an Object Using Digitally Encoded Optical Data, issued Jul. 24, 2001, Olson et al., application Ser. No. 09/419,547 entitled Detection Apparatus and Method Using Digitally Encoded Serial Data, filed Oct. 18, 1999; and Berghoff et al., application Ser. No. 09/691,366 entitled Automatic Portion Control Using Strain Gauge Technology, filed Oct. 18, 2000.

All US patents and patent applications, and all other published documents mentioned anywhere in this application are incorporated by reference in their entirety.

BRIEF SUMMARY OF THE INVENTION

The invention provides an apparatus and method for fast, reliable, error minimized object or material detection. The apparatus and method for detecting objects which utilizes pulse amplitude differential measurement. The apparatus and method are particularly useful to detect objects or material in systems where the steam of objects is discontinuous and/or of odd or differing shapes and sizes. Examples of such objects include solids such as ice or powder, and liquids such as beverages and oils, and the like. Examples of systems include medical/pharmaceutical dispensing systems, automated manufacturing and production systems, food processing systems, commercial and industrial food service systems, packaging systems, and other commercial, industrial, municipal and residential systems.

One aspect of the invention involves a detection apparatus, comprising:
  (a) an emitter for emitting a plurality of optical pulses;
  (b) a detector for receiving the optical pulses from the emitter; and
  (c) a controller connected to the emitter and the detector, the controller comparing a difference between at least one pulse received at the detector and at least one other pulse received at the detector with a threshold to detect the presence of an object between the emitter and detector.

Another aspect of the invention involves an object processing system, which automatically detects the presence of objects at at least one predetermined location during object processing, comprising:
  (a) an object processing subsystem; and
  (b) an object detection subsystem communicatively connected to the object processing subsystem, the object detection subsystem, comprising:
    (1) an infrared emitter for emitting a plurality of optical pulses, the emitter including at least one LED;
    (2) an infrared detector for receiving the optical pulses from the emitter, the detector including at least one phototransistor; and
    (3) a controller connected to the emitter and the detector, the controller comprising:
      (i) a pulse generator communicatively connected to the emitter;
      (ii) an output circuit communicatively connected to the detector; and
      (iii) a microcontroller communicatively connected to the pulse generator and to the output circuit;
      whereby the controller compares a difference between at least one pulse received at the detector and at least one other pulse received at the detector with a threshold to detect the presence of an object between the emitter and detector.

The features, benefits and objects of the invention will become clear to those skilled in the art by reference to the following description, claims, and drawings.

DETAILED DESCRIPTION

The purpose of the invention is to enable detection of objects or material (collectively, an "object" or "objects"). The apparatus and method of the invention are particularly useful for objects or material which may be moving at high speed, objects which may be moving randomly, objects or material in a steam of objects or material which is discontinuous, and/or objects of odd or differing shapes and sizes. The apparatus and method of the invention are also useful for detecting steady state blockages of moving objects or material.

Examples of objects, articles or material which may be detected by the apparatus and method of the invention include, but are not limited to, solid objects or material such as ice or powders, and liquids such as dispensed beverages. Examples of a object or material processing systems include, but are not limited to ice harvesting units and ice collection bins of ice making systems. In general, they include any system which creates, manufactures, transports, dispenses, handles, and/or manipulates objects. Such systems include automated and manually operated systems.

One embodiment of the method and apparatus of the invention determines whether an object or material is present by detecting the absence of a received pulse or the difference in amplitude between one transmitted pulse and another transmitted pulse. Consecutive pulse amplitude readings are compared against a predetermined threshold value. If the difference between any pulse readings exceeds the threshold value, it is assumed that an object or material under observation has passed through the light beam. Using this difference method cancels out the effect of noise or error because the apparatus and method analyze changes in signals not the actual signal level itself.

The apparatus and method of the invention minimize vulnerability to noise or error caused by dirty, scaled or otherwise fully or partially blocked transmitters or sensors, weak transmitters or sensors, fluctuations in temperature, resistance or capacitance, or ambient sunlight or interior lighting.

Figure 1:
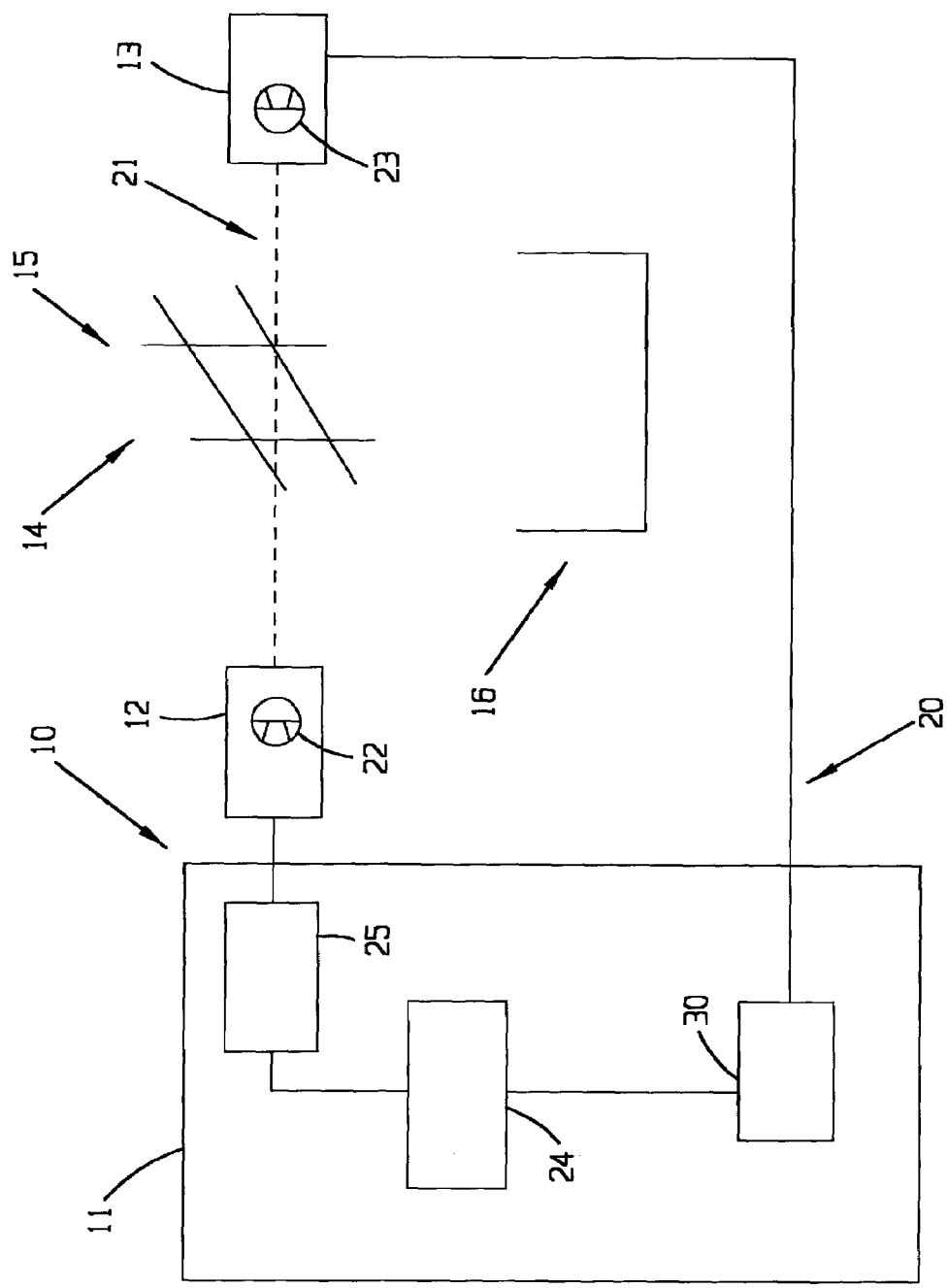
FIG. 1 illustrates an embodiment of the apparatus of the invention used in connection with an ice system.

Referring to FIG. 1, an embodiment of the object detection apparatus 10 of the present invention for detecting ice harvest and/or ice bin full in an ice system is shown. The apparatus 10 comprises a control unit or controller 11, a transmitter or emitter 12 and a sensor or detector 13. The apparatus 10 is shown connected and arranged with the ice making system 14 comprising an ice harvest station 15 operatively disposed with an ice collection bin 16. The structure and function of ice making systems is well known. Alternatively, the detection apparatus may be constructed as part of the ice system 14. The control unit 11, transmittor 12 and sensor 13 are connected by suitable connection cabling 20. Alternatively, connection may be wireless. The transmitter 12, and/or the sensor 13 may be integrally formed with the control unit 11.

An additional object detection apparatus (not shown) substantially similar to apparatus 10 may be disposed to detect when ice falling from the harvest station 15 fills the bin 16. Alternatively, additional transmittor-sensor pairs (not shown) may be coupled to the single control unit 11 to detect an ice bin full condition. The control unit 11 is preferably communicatively coupled to means to remove or harvest completed ice cubes or other ice configurations on the cooling means of the ice harvest station 15 when such cubes are fully formed as determined by the object detection apparatus 10. Additionally, the control unit 11 or a second control unit may be connected to means to empty the bin 16 when a full condition is sensed by such unit.

In use, the system 10 transmitter 12 transmits a pulsating beam 21 of infrared (IR) light, preferably using high intensity IR transmitters, preferably one or more IR light emitting diodes (LED's) 22. The light or optical beam 21 is normally received by the sensor 13 via an IR phototransistor 23 unless blocked by an object, in this case ice forming on cooling means of the ice harvest station 15. The LED is turned on at predetermined intervals to create light pulses or periodic signals. Voltage output from the phototransistor 23 as a result of light reception is fed into an analog input of a micro controller 24, which is preferably a part of the control unit 11. This allows the controller 24 to measure the relative amplitude of the light being received. Each time the LED is pulsed or turned on, the controller samples an analog reading at the analog input. Consecutive readings are compared by the controller 24 against a threshold value. The threshold value is preferably software or otherwise adjustable. If the difference between any readings exceeds the threshold value, the controller assumes that the detected object, in this case a predetermined level of ice constituting a desired ice cube configuration, has impacted the light beam 21.

This difference method cancels out much of the effect of dirty or weak emitters and detectors, and/or ambient IR light caused by sunlight or artificial light, because the system looks at a change in signal not the actual signal level itself.

Figure 2:
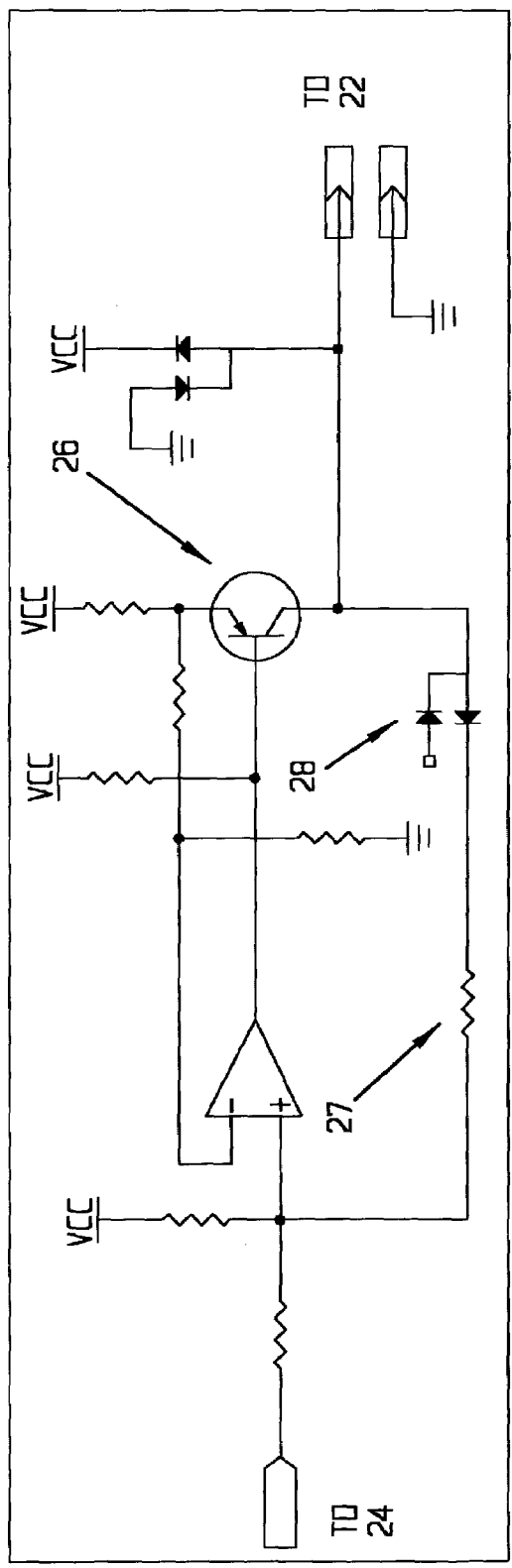
FIG. 2 illustrates an LED driver circuit of the apparatus embodiment of FIG. 1.

Referring to FIG. 2, the control unit 11 further comprises a pulse generator circuit 25 which drives the IR emitting LED 22. The driver 25 preferably operates at a frequency of about 200 Hz. Higher speeds of for example 10 kHz may also be utilized. The circuit 25 is a constant current sourcing circuit using a high side driver transistor 26. A feedback loop comprising resistor 27 and diodes 28 tends to adjust the current based on the voltage dropped across the LED 22 to provide a constant power on the emitter 12. The input to the circuit is driven directly from a port pin of the micro controller 24. One or two LED's 22 can be connected in series at the output.

Figure 3:
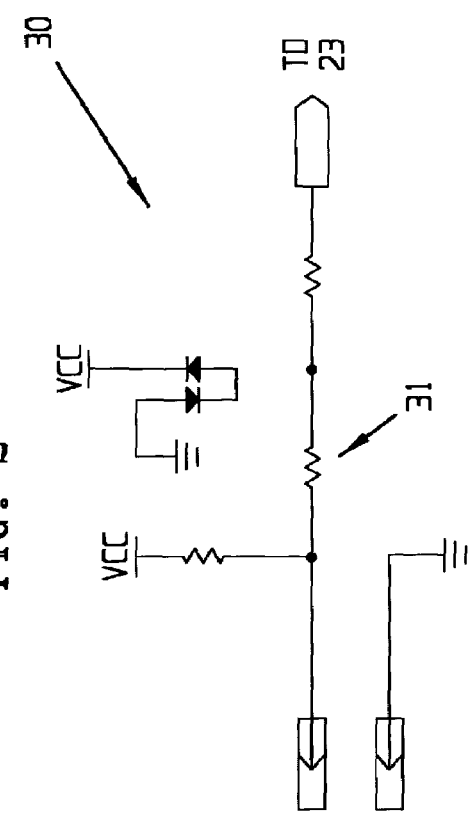
FIG. 3 illustrates an IR detector input circuit of the apparatus embodiment of FIG. 1.

FIG. 3 shows an input circuit 30 which is preferably connected to the IR photo transistor 23 of the detector 13. The output of this circuit 30 is connected to the analog input of the micro controller 25. A pull up resistor 31 pulls this signal high when the phototransistor 23 is off. As IR light 21 is received by the phototransistor 23, it begins to turn on and pull this signal to a lower voltage. The higher the intensity of the received IR signal, the lower the voltage at the detector 13.

The apparatus 10 may contain various power, indication and other ancillary structures or functions (not shown).

Although the apparatus and method of the invention is described above in connection with an ice making application, it is within the purview of the invention that the object detection apparatus and method may be used with other object, article or material handling applications to detect material flow or level. General examples of such objects and materials include solids such as powder, and liquids such as beverages and oils, and the like. General examples of systems include medical/pharmaceutical dispensing systems, automated manufacturing and production systems, food processing systems, commercial and industrial food service systems, packaging systems, and other commercial, industrial, municipal and residential systems. Particular examples of such systems include food service equipment such as ice dispensers to detect when a desired level of ice fills a cup, beverage dispensers to detect when a desired level of beverage fills a cup, or fryers to detect when the level of oil is or is not present.

The descriptions above and the accompanying drawings should be interpreted in the illustrative and not the limited sense. While the invention has been disclosed in connection with an embodiment or embodiments thereof, it should be understood by those skilled in the art that there may be other embodiments which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. An apparatus for detecting the presence of an object and for use with an object processing system, comprising:
    (a) an infrared emitter for emitting a plurality of optical pulses, the emitter including at least one LED;
    (b) an infrared detector for receiving the optical pulses from the emitter, the detector including at least one phototransistor; and
    (c) a controller connected to the emitter and the detector, the controller comprising:
        (i) a pulse generator communicatively connected to the emitter;
        (ii) an output circuit communicatively connected to the detector; and
        (iii) a microcontroller communicatively connected to the pulse generator and to the output circuit;
        whereby the controller compares a difference between at least one pulse received at the detector and at least one other pulse received at the detector with a threshold to detect the presence of an object between the emitter and detector.

2. An object processing system, which automatically detects the presence of objects at at least one predetermined location, comprising:
    (a) an object processing subsystem; and
    (b) an object detection subsystem communicatively connected to the object processing subsystem, the object detection subsystem, comprising:
    (1) an infrared emitter for emitting a plurality of optical pulses, the emitter including at least one LED;
    (2) an infrared detector for receiving the optical pulses from the emitter, the detector including at least one phototransistor; and
    (3) a controller connected to the emitter and the detector, the controller comprising:
        (i) a pulse generator communicatively connected to the emitter;
        (ii) an output circuit communicatively connected to the detector; and
        (iii) a microcontroller communicatively connected to the pulse generator and to the output circuit;
        whereby the controller compares a difference between at least one pulse received at the detector and at least one other pulse received at the detector with a threshold to detect the presence of an object between the emitter and detector.

* * * * *